US011577865B2

(12) United States Patent
Jawale et al.

(10) Patent No.: US 11,577,865 B2
(45) Date of Patent: Feb. 14, 2023

(54) INTEGRATED WRAPPING SYSTEM FOR LARGE SQUARE BALER

(71) Applicant: DEERE & COMPANY, Moline, IL (US)

(72) Inventors: Vinit Jawale, Pune (IN); Nikhil Kulkarni, Pune (IN); Darin L Roth, Batavia, IA (US)

(73) Assignee: DEERE & COMPANY, Moline, IL (US)

( * ) Notice: Subject to any disclaimer, the term of this patent is extended or adjusted under 35 U.S.C. 154(b) by 544 days.

(21) Appl. No.: 16/705,284

(22) Filed: Dec. 6, 2019

(65) Prior Publication Data
US 2021/0169012 A1    Jun. 10, 2021

(51) Int. Cl.
*B65B 11/02* (2006.01)
*A01F 15/07* (2006.01)

(52) U.S. Cl.
CPC .......... *B65B 11/025* (2013.01); *A01F 15/071* (2013.01); *A01F 2015/0735* (2013.01)

(58) Field of Classification Search
CPC ....... B65B 11/00; B65B 11/008; B65B 11/02; B65B 11/025; A01F 15/071; A01F 2015/0735
See application file for complete search history.

(56) References Cited

U.S. PATENT DOCUMENTS 4,972,565 A    11/1990 Eckold et al.
5,740,662 A *  4/1998 Royneberg ............ A01F 15/071
                                              53/556
5,768,862 A *  6/1998 Mauro .................. B65B 11/025
                                              53/556
6,722,110 B1   4/2004  Royneberg
8,544,241 B2  10/2013  Reijersen-Van Buuren
(Continued)

FOREIGN PATENT DOCUMENTS

CN    103910076 A    7/2014
CN    107839938 A    3/2018
(Continued)

OTHER PUBLICATIONS

Extended European Search Report and Written Opinion issued in European Patent Application No. 20207944.8, dated Apr. 23, 2021, in 07 pages.
(Continued)

*Primary Examiner* — Chelsea E Stinson

(57) ABSTRACT

A large square baler includes a frame and a baling chamber for forming a bale. A support beam is attached to the frame and extends to a distal second end. A support structure is attached to the second end of the support beam. A track is attached to the support structure and includes an endless loop defining a path. A rotational drive is attached to the support structure and includes a crank rotatable about a rotation axis. An arm is coupled to the crank and includes an elongated slot. A carriage is attached to the arm and moves on the track along the path. The carriage supports a transverse face wrap roller for wrapping the transverse faces of the bale. A portion of the crank extends through and is moveable within the elongated slot such that a distance between the carriage and the rotation axis is variable.

18 Claims, 7 Drawing Sheets

(56) References Cited

U.S. PATENT DOCUMENTS

| | | | |
|---|---|---|---|
| 2004/0231302 A1* | 11/2004 | Haloila | B65B 25/24 |
| | | | 53/588 |
| 2007/0081878 A1 | 4/2007 | McHale et al. | |
| 2010/0024357 A1 | 2/2010 | Viaud | |
| 2012/0324830 A1 | 12/2012 | Reijersen Van Buuren | |
| 2016/0120128 A1 | 5/2016 | Guerin | |
| 2018/0279559 A1 | 10/2018 | Guerin et al. | |
| 2018/0368328 A1 | 12/2018 | Gresset et al. | |
| 2019/0069492 A1 | 3/2019 | Mathes et al. | |
| 2020/0000042 A1* | 1/2020 | Desrochers | A01F 15/071 |

FOREIGN PATENT DOCUMENTS

| | | |
|---|---|---|
| CN | 108528873 A | 9/2018 |
| IE | 20110102 A1 | 10/2011 |
| KR | 101418547 B1 | 7/2014 |
| TR | 201412740 A2 | 11/2015 |
| WO | WO9844776 A1 | 10/1998 |
| WO | WO0036903 A1 | 6/2000 |
| WO | WO2006137046 A2 | 12/2006 |
| WO | WO2011142660 A1 | 11/2011 |

OTHER PUBLICATIONS

Extended European Search Report and Written Opinion issued in European Patent Application No. 20207943.0, dated Apr. 26, 2021, in 08 pages.

* cited by examiner

INTEGRATED WRAPPING SYSTEM FOR LARGE SQUARE BALER

TECHNICAL FIELD

The disclosure generally relates to a large square baler with an integrated bale wrapping system.

BACKGROUND

Baling implements gather cut crop material and form the crop material into a bale. Generally, the bales may include either round cylindrical shape or a rectangular shape. The size of the bales may also vary. For example, the dimensions of a large rectangular shaped bale, commonly referred to as a "large square bale" may include end face dimensions between, for example, 3 and 5 feet, and length dimensions between, for example, 4 and 9 feet. In certain circumstances, it is desirable to wrap the bale in a wrap material. For example, in some circumstances, the bale may be completely wrapped in a plastic sheet.

Traditionally, operators wishing to wrap large square bales have formed the bales in the bailing implement, and then dropped the formed bales on the ground. After the formed bales have been deposited on the ground, a tractor pulling a separate wrapping implement picks up the large square bale and wraps the large square bale with plastic wrap material. This is an additional step which adds to the time to complete the bale. Additionally, traditional wrapping implements typically rotate or tumble the bale in three dimensions to ensure that all portions of the bale faces are completely covered. Because of this, the length of the large square bales that may be processed in these traditional square bale wrapping implements is limited. Generally, these types of wrapping implements are limited to large square bales having a length of less than 5 feet.

SUMMARY

A crop baling implement is provided. The crop baling implement includes a frame, and a baling chamber attached to the frame. The baling chamber is sized to form crop material into a bale extending along a central longitudinal axis, and including a left side face, a right side face, a top face, a bottom face, a forward end face, and a rearward end face. Each of the left side face, the right side face, the top face, and the bottom face extend along the central longitudinal axis of the bale. Each of the forward end face and the rearward end face extend transverse to the central longitudinal axis of the bale. A transverse face wrap roller is coupled to the frame and moveable in an endless loop along a path surrounding. The transverse face wrap roller is operable to hold a roll of wrap material and wrap the forward end face and the rearward end face of the bale with the wrap material as the transverse face wrap roller moves in the endless loop along the path.

In one aspect of the disclosure, the baling implement includes a track. The track forms a closed loop defining the path. In one embodiment of the disclosure, the track defines a rounded rectangular shape. The track includes a pair of opposing longitudinal legs and a pair of opposing transverse legs. Each of the pair of longitudinal legs has a length that is greater than each of the pair of transverse legs. The pair of longitudinal legs extend along a longitudinal axis of the frame, when the track is positioned in a deployed position, for wrapping the forward end face and the rearward end face with the wrap material. The pair of transverse legs extend transverse to the longitudinal axis of the frame, when the track is positioned in the deployed position, for wrapping the forward end face and the rearward end face with the wrap material.

In one aspect of the disclosure, the baling implement includes a carriage. The carriage is coupled to the track and supports the transverse face wrap roller. The carriage is moveable on the track to follow the path defined by the track.

In one aspect of the disclosure, the baling implement includes an arm attached to and moveable with the carriage. The arm extends from the carriage inward toward an interior region of the closed loop of the track. The arm includes an elongated slot. In one aspect of the disclosure, the baling implement includes a rotational drive. The rotational drive includes a crank rotatable about a rotation axis. The crank includes a portion extending through and moveable within the elongated slot of the arm, such that the portion of the crank moves back and forth within the elongated slot as the carriage moves around the path defined by the track. As such, a distance between the transverse face wrap roller and the rotation axis is variable with movement of the transverse face wrap roller around the path defined by the track.

In one aspect of the disclosure, the rotational drive includes a motor. The motor is coupled to the crank and is operable to rotate the crank about the rotation axis. The motor may include, but is not limited to, and electric motor, a hydraulic motor, an internal combustion engine, or some other device capable of rotating the crank.

In one aspect of the disclosure, the baling implement includes a support structure that interconnects the rotational drive and the track. Additionally, a support beam interconnects the frame and the support structure. The support beam includes a first end pivotably attached to the frame for rotational movement about a first beam axis. The support beam includes a second end that is attached to the support structure. The support beam includes a first beam portion including the first end, a second beam portion including the second end, and a hinge joint interconnecting the first beam portion and the second beam portion. The hinge joint enables rotational movement between the first beam portion and the second beam portion about a second beam axis. In one embodiment, the first beam axis, the second beam axis, and the rotation axis are substantially parallel with each other.

In one aspect of the disclosure, the first beam portion and the second beam portion are moveable relative to the frame between a deployed position and a transport position. When dispose din the deployed position, the support beam positions the support structure and the track for wrapping the forward end face and the rearward end face of the bale. When disposed in the transport position, the support beam positions the support structure and the track generally rearward of the frame.

In one aspect of the disclosure, the baling implement includes a longitudinal face wrap roller that is coupled to the frame. The longitudinal face wrap roller is moveable in an endless loop along a second path that encircles the bale as the bale is ejected from the baling chamber. The longitudinal face wrap roller is operable to hold a roll of wrap material and wrap the left side face, the right side face, the top face, and the bottom face of the bale with the wrap material as the longitudinal face wrap roller moves in the endless loop along the second path and around the bale.

In one aspect of the disclosure, the baling implement includes a trailer coupled to the frame and positioned to receive the bale directly from the baling chamber as the bale is ejected from the baling chamber. The trailer defines a first position disposed rearward of the baling chamber for receiving the bale from the baling chamber, and a second position laterally offset to a side of the first position. The bale is positioned relative to the track so that the transverse face wrap roller encircles the bale when the bale is disposed in the second position of the trailer, and the support beam is disposed in the deployed position.

Accordingly, the baling implement described herein both forms the bale and wraps the bale with the wrap material. The longitudinal face wrap roller wraps the longitudinal faces of the bale, i.e., the left side face, the right side face, the top face, and the bottom face, as the bale is discharged from the baling chamber onto the first position of the trailer. The bale may then be moved to the second position of the trailer, where the transverse face wrap roller moves around the track and wraps the forward end face and the rearward end face in the wrap material, thereby completely enclosing the bale in the wrap material. The sliding interaction between the crank and the elongated slot in the arm allows the distance between the carriage and the rotation axis to vary as the carriage moves around the track. As such, the track may be configured in the rounded rectangular shape, which reduces the size of track relative to fixed radius wrapping machines. This enables the baling implement to wrap large square bales having a length greater than 5 feet long. Because of the joint in the support beam, the track may be positioned directly rearward of the baling chamber, generally with in a width of the baling chamber, enabling transport down roadways.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
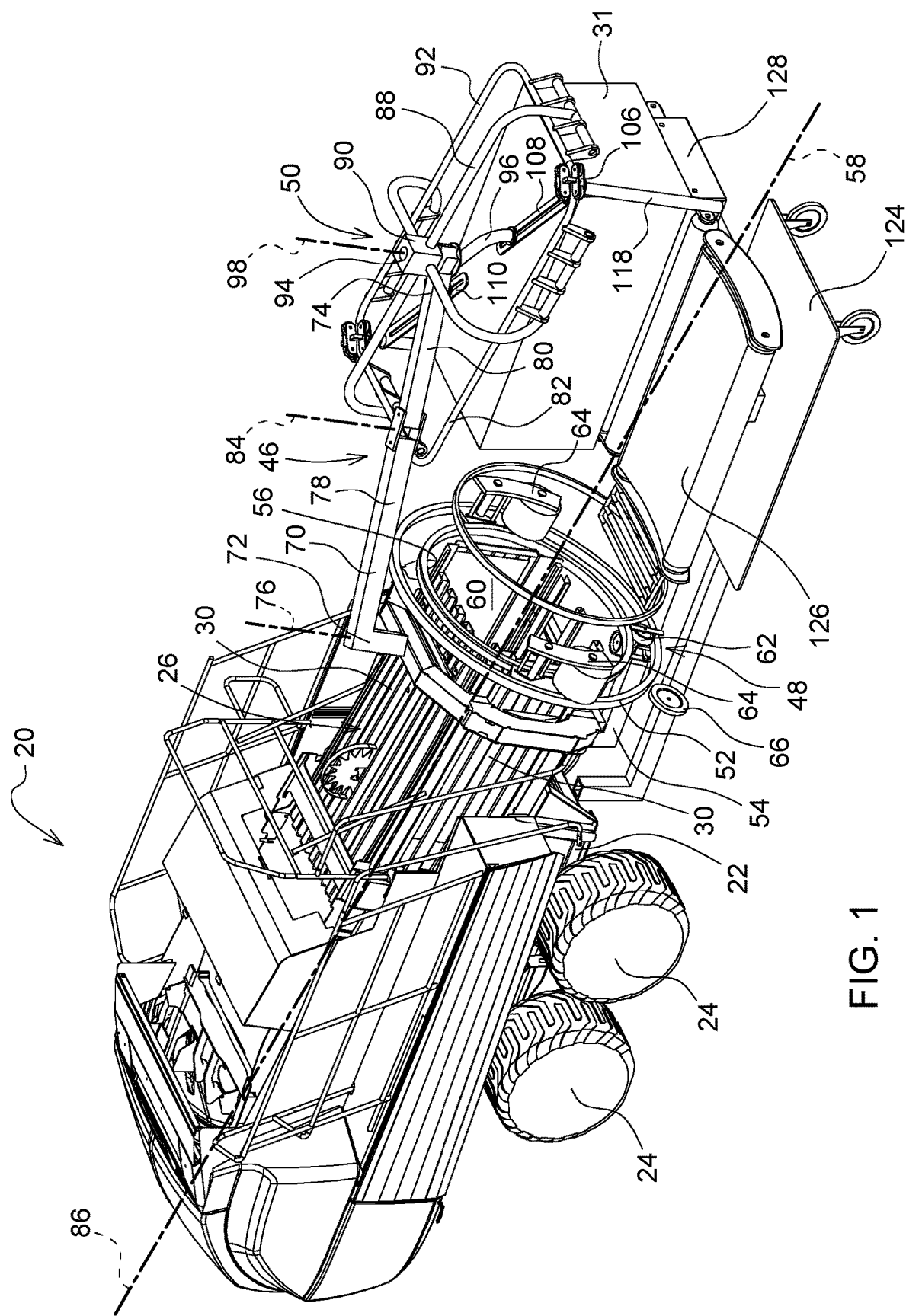
FIG. 1 is a schematic perspective view of a baling implement.
Figure 2:
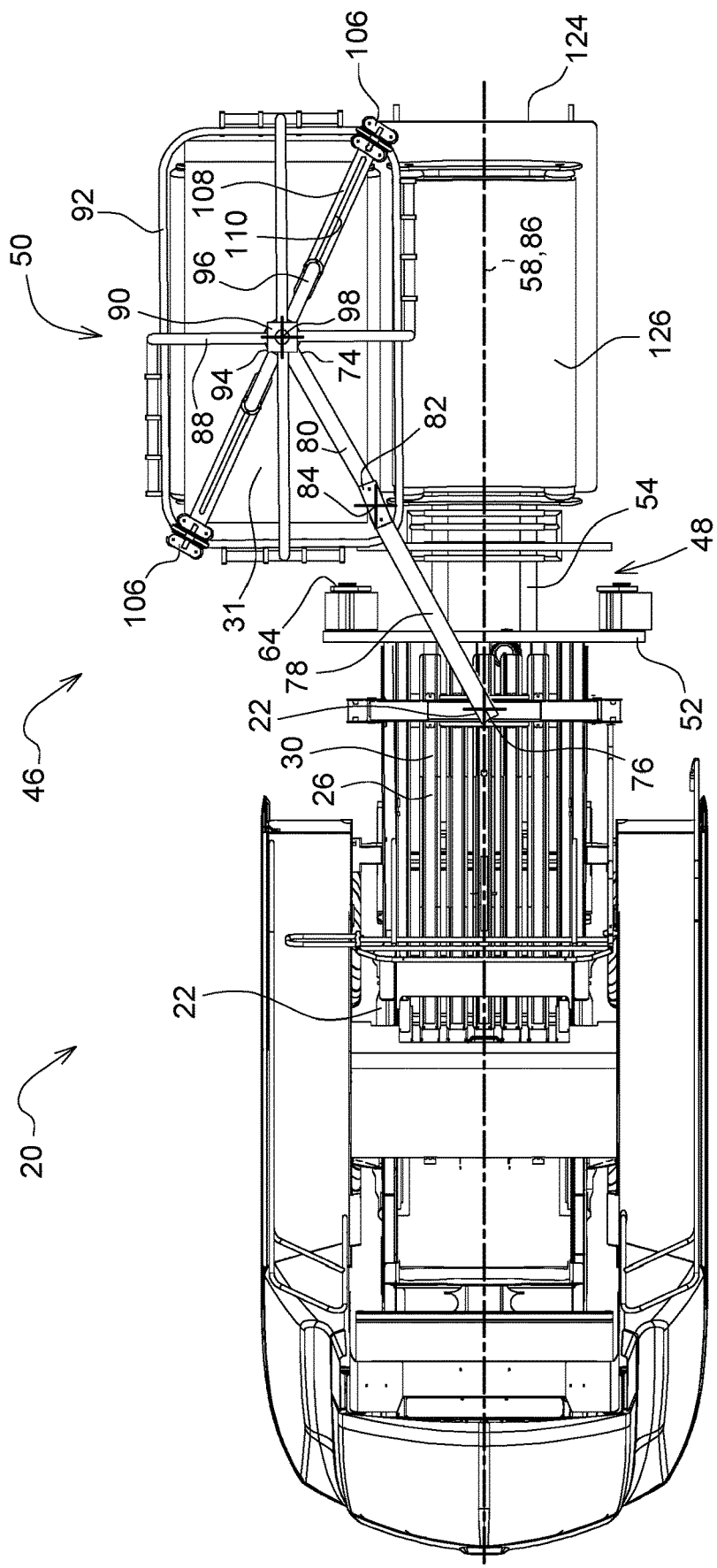
FIG. 2 is a schematic plan view of the baling implement showing a support beam in a deployed position.
Figure 3:
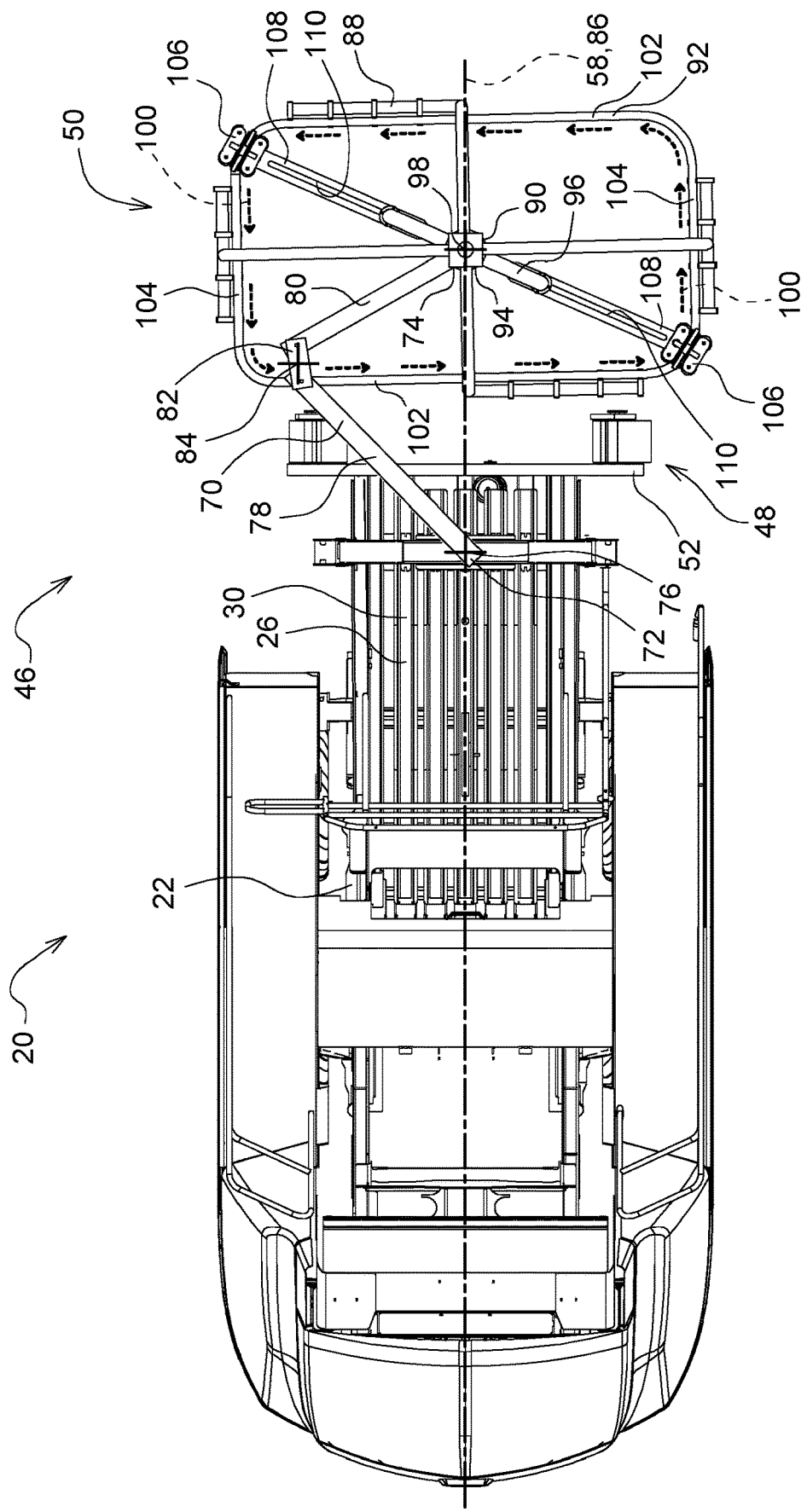
FIG. 3 is a schematic plan view of the baling implement showing the support beam in a transport position.

Referring to the Figures, wherein like numerals indicate like parts throughout the several views, a crop baling implement is generally shown at 20. Referring to FIGS. 1-3, the crop baling implement 20 shown in the Figures and described herein is embodied as a large square baler. However, it should be appreciated that that the teachings of this disclosure may be applied to other types and configurations of the crop baling implement 20.

With reference to FIG. 1, and as is understood by those skilled in the art, the crop baling implement 20 includes a frame 22 supporting ground engaging elements 24, e.g., wheels or tracks. The frame 22 includes and/or supports a baling chamber 26. The crop baling implement 20 gathers cut crop material and moves the crop material into the baling chamber 26 with a feed system (not shown). The baling chamber 26 includes walls 30 that form the crop material into a rectangular shape. A plunger (not shown) compresses the crop material into a flake. The process is repeated with each flake adding to a length of the bale. When the bale reaches a desired length, measured along a central longitudinal axis 32 of the bale, a knotter system (not shown) ties a twine around the bale to secure the flakes together and form the bale.

The bales of crop material formed by the crop baling implement 20 described herein may be referred to as large square bales. Typically, referring to FIG. 7, the bales have a width 130 approximately equal to three or four feet, a height 132 approximately equal to three or four feet, and a length 134 that may vary between approximately four to eight feet. It should be appreciated that the dimensions of the bales formed by the example embodiment of the crop baling implement 20 may vary from the example dimensions described above. The operations of the crop baling implement 20 used to form and tie the bales are known to those skilled in the art, are not pertinent to the teachings of the disclosure, and are therefore not described in detail herein.

Figure 7:
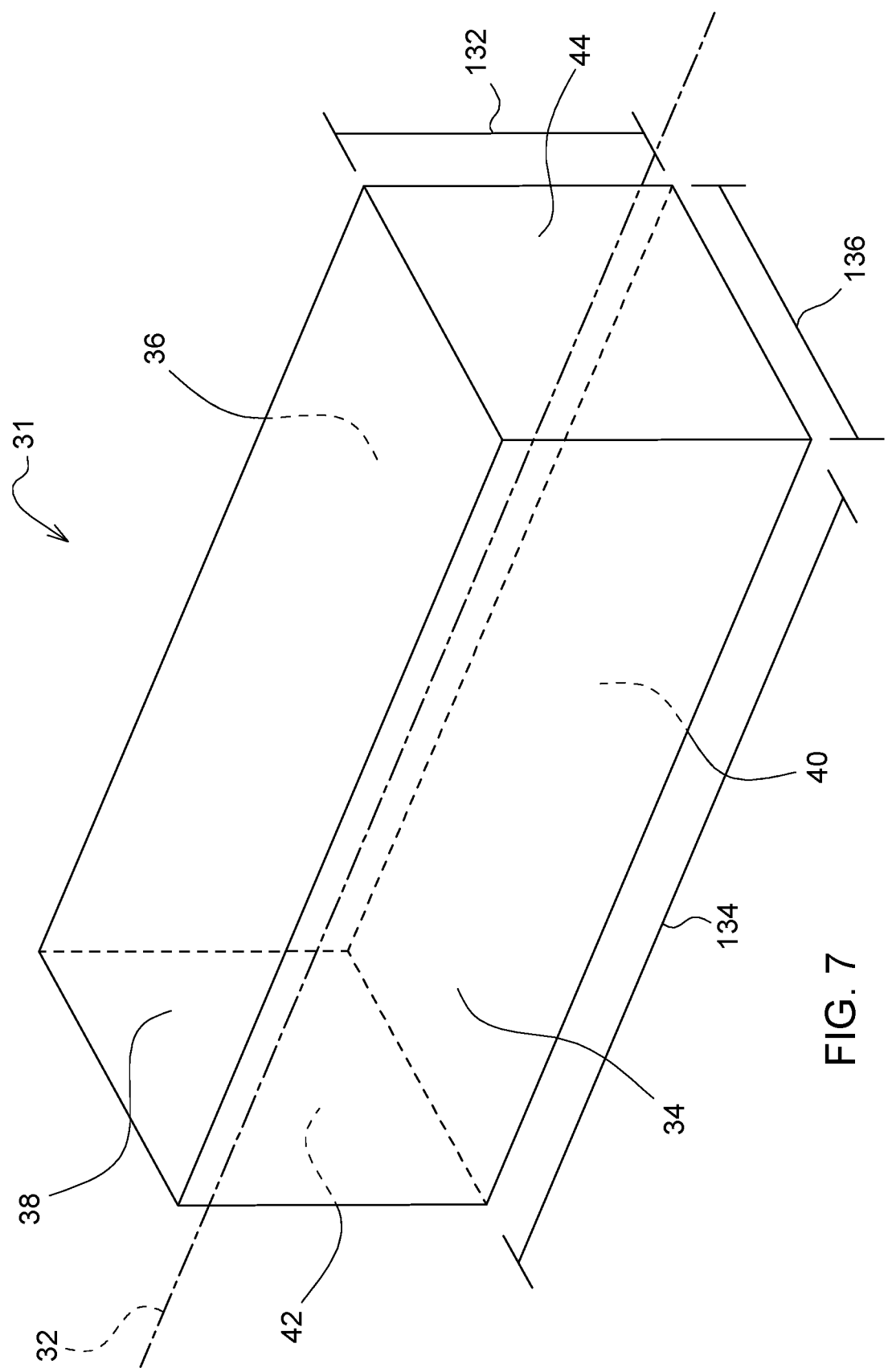
FIG. 7 is a schematic perspective view of a bale.

As shown in FIG. 7, the bale formed by the example embodiment of the crop baling implement 20 described herein includes a left side face 34, a right side face 36, a top face 38, a bottom face 40, a forward end face 42, and a rearward end face 44. Each of the left side face 34, the right side face 36, the top face 38, and the bottom face 40 extend along the central longitudinal axis 32, and may be referred to as longitudinal faces of the bale. Each of the forward end face 42 and the rearward end face 44 extend transverse to the central longitudinal axis 32, and may be referred to as transverse faces of the bale.

Certain crops and/or crops having a certain moisture content, e.g., silage, may need to be wrapped with a wrap material, such as but not limited to a solid plastic wrap, to completely enclose the bale in a substantially air tight wrapping. In other embodiments, the bales may be wrapped with a non-solid, net type wrap material. In order to wrap the bales with the wrap material, the crop baling implement 20 is equipped with a wrap system. Referring to FIG. 1, the wrap system may include, for example, a longitudinal face wrap system 48 for wrapping the longitudinal faces of the bale, and a transverse face wrap system 50 for wrapping the transverse faces of the bale.

Referring to FIG. 1, the longitudinal face wrap system 48 is configured to wrap the longitudinal faces of the bale, i.e., left side face 34, the right side face 36, the top face 38, and the bottom face 40. The longitudinal face wrap system 48 includes a fixed support 52 attached to the frame 22. In the example embodiment shown in the Figures, the frame 22 includes a bale chute 54, with the fixed support 52 attached to the bale chute 54. However, it should be appreciated that the fixed support 52 may be attached to the frame 22 in some other manner. The fixed support 52 includes an annular or circular shape that encircles the bale as the bale is discharged from the baling chamber 26, on the bale chute 54. As such, the fixed support 52 is disposed rearward of the baling chamber 26.

The fixed support 52 rotatably supports an orbital support 56. The orbital support 56 is rotatable about a wrap axis 58, and is moveable about the wrap axis 58 relative to the fixed support 52. The orbital support 56 defines an open central region 60 and is positioned to receive the bale from the baling chamber 26 and pass the bale through the open central region 60 of the orbital support 56. The orbital support 56 also includes an annular or circular shape that encircles the bale as the bale is discharged from the baling chamber 26, on the bale chute 54.

The longitudinal face wrap system 48 further includes a plurality of rollers 62 interconnecting the orbital support 56 and the fixed support 52. The rollers 62 allow rotation of the orbital support 56 relative to the fixed support 52. As such, the shape of the fixed support 52 generally defines an endless loop forming a second path that the orbital support 56 follows, as the orbital support 56 moves about the wrap axis 58 relative to the fixed support 52.

A longitudinal face wrap roller 64 is attached to and moveable with the orbital support 56. The longitudinal face wrap roller 64 is moveable in the endless loop along the second path encircling the bale as the bale is ejected from the baling chamber 26. The longitudinal face wrap roller 64 is operable to hold a roll of wrap material 122 and wrap the left side face 34, the right side face 36, the top face 38, and the bottom face 40 of the bale with the wrap material as the longitudinal face wrap roller 64 moves in the endless loop along the second path and around the bale.

A drive 66 is coupled to the orbital support 56. The drive 66 is operable to rotate the orbital support 56 and the wrap roller about the wrap axis 58 to wrap the wrap material around the bale as the bale moves through the open central region 60 of the orbital support 56. The drive 66 may include any device and/or system capable of rotating the orbital support 56 relative to the fixed support 52. In the example embodiment shown in the Figures and described herein, the drive 66 includes a motor 94 that rotates a wheel. Frictional engagement between the wheel and the orbital support 56 causes the orbital support 56 to rotate about the wrap axis 58 relative to the fixed support 52. The motor 94 may include, but is not limited to, an electric motor 94, a hydraulic motor 94, or some other type of device capable of rotating the wheel. It should be appreciated that the drive 66 may include some other device not described or shown herein that is capable of rotating the orbital support 56 relative to the fixed support 52.

The longitudinal face wrap roller 64 may further include a wrap cutter 68 attached to and moveable with the orbital support 56. The wrap cutter 68 is disposed adjacent to the wrap roller, and is operable to secure and cut the wrap material dispensed from the wrap roller.

Figure 4:
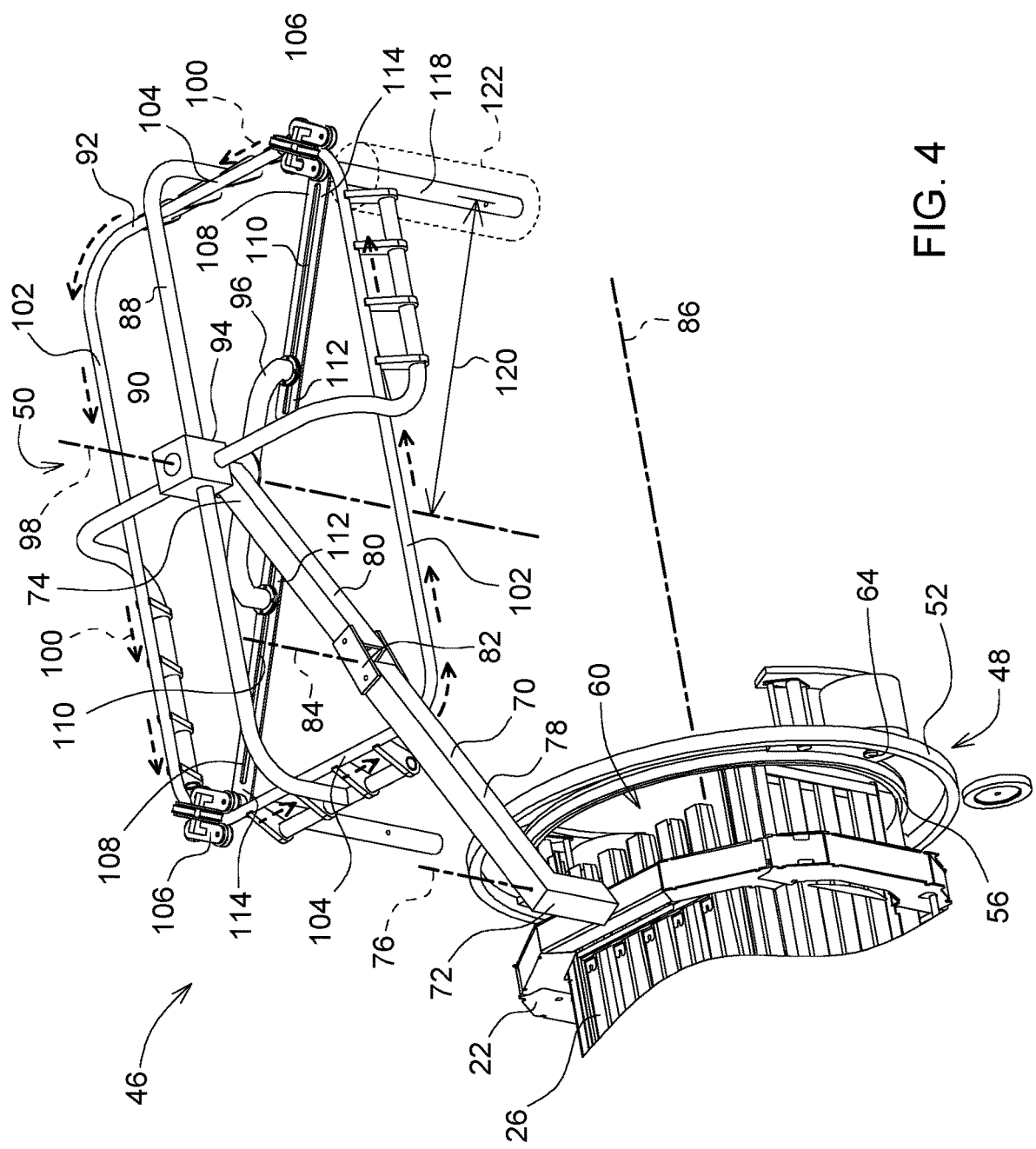
FIG. 4 is a schematic partial perspective view of the baling implement showing a transverse face wrap system.
Figure 5:
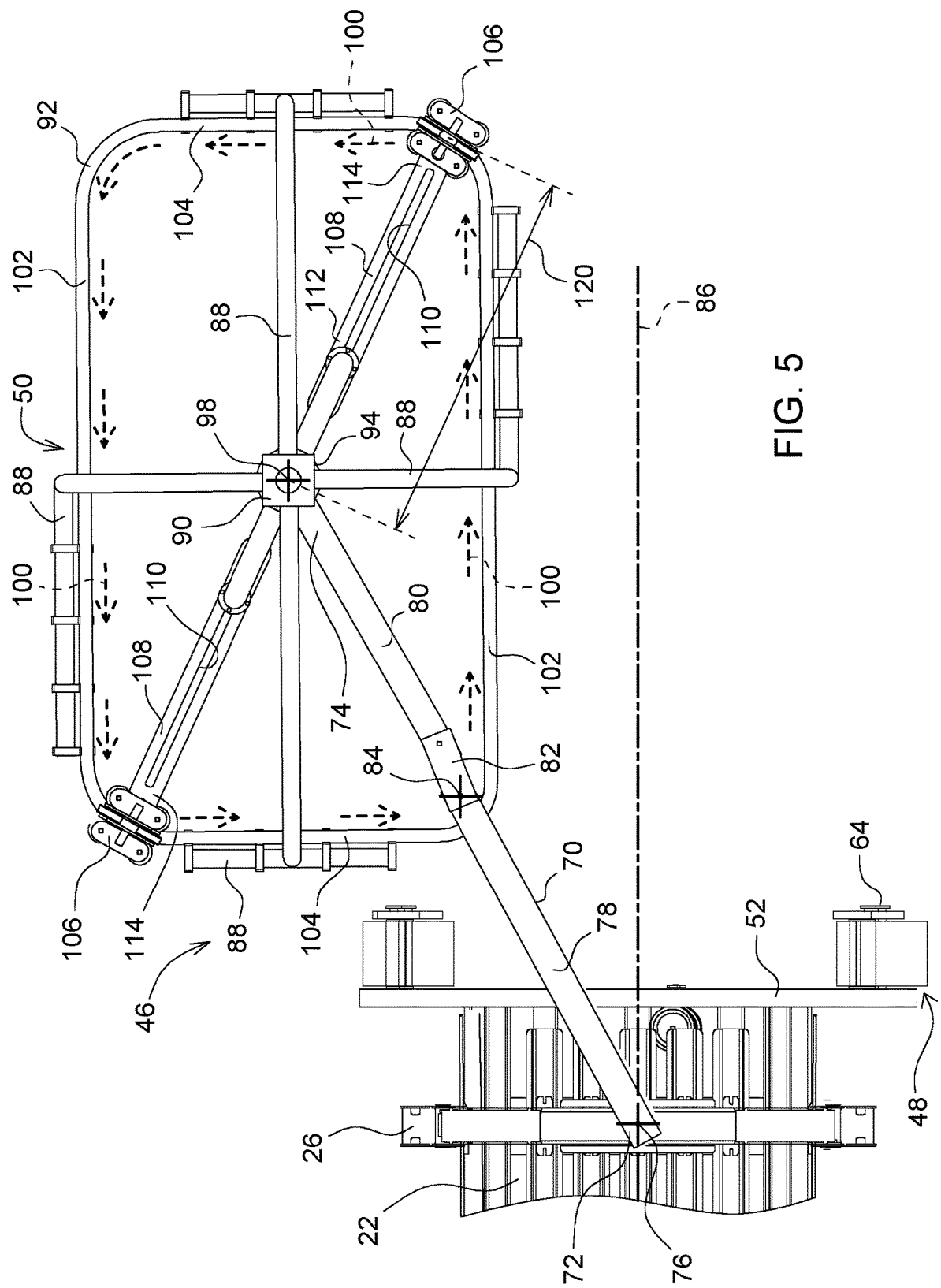
FIG. 5 is a schematic partial plan view of the baling implement showing the transverse face wrap system.

Referring to FIGS. 4 and 5, the transverse face wrap system 50 is configured to wrap the transverse faces of the bale, i.e., the forward end face 42 and the rearward end face 44, after the longitudinal face wrap system 48 has finished wrapping the longitudinal faces of the bale.

The transverse face wrap system 50 includes a support beam 70. The support beam 70 includes a first end 72 and a distal second end 74. The first end 72 of the support beam 70 is pivotably attached to the frame 22 for rotational movement about a first beam axis 76. As shown in the example embodiment, the first beam axis 76 is a generally vertical axis, such that the support beam 70 rotates on a generally horizontal plane about the first beam axis 76. The support beam 70 may be pivotably attached to the frame 22 in any suitable manner. For example, a pin joint may be used to connect the first end 72 of the support beam 70 to the frame 22. The pin joint may include, for example, a pin attached to the frame 22 and extending in a vertical direction, and a receiving bore attached to the first end 72 of the beam. The receiving bore is slidably disposed over the pin, such that the frame 22 supports the support beam 70 in the vertical direction, and the interaction between the pin and the receiving bore allows the support beam 70 to rotate on a horizontal plane. It should be appreciated that the support beam 70 may be attached to and supported by the beam in some other manner not mentioned or described herein that enables the first beam portion 78 to rotate about the first beam axis 76 relative to the frame 22, while supporting a vertical load against significant vertical deflection.

In the example embodiment shown in the Figures, the support beam 70 includes a first beam portion 78 including the first end 72, and a second beam portion 80 including the second end 74. A hinge joint 82 interconnects the first beam portion 78 and the second beam portion 80. The hinge joint 82 enables rotational movement between the first beam portion 78 and the second beam portion 80 about a second beam axis 84. As shown in the example embodiment, the second beam axis 84 is a generally vertical axis, such that the second beam portion 80 rotates relative to the first beam portion 78 about the second beam axis 84 and on a substantially horizontal plane. The hinge joint 82 may be constructed in any manner that enables the second beam portion 80 to rotate about the second beam axis 84 relative to the first beam portion 78, while supporting a vertical load against significant vertical deflection.

The first beam portion 78 and the second beam portion 80 are moveable relative to the frame 22 between a deployed position, shown in FIG. 2, and a transport position, shown in FIG. 3. When support beam 70 is positioned in the deployed position, the first beam portion 78 and the second beam portion 80 are extended to position the transverse face wrap system 50 rearward and laterally offset to one side of a longitudinal centerline 86 of the frame 22, for wrapping the forward end face 42 and the rearward end face 44 of the bale. When the support beam 70 is positioned in the transport position, the first beam portion 78 and the second beam portion 80 are disposed generally rearward of the frame 22, generally within a width of the crop baling implement 20 measured perpendicular to the longitudinal centerline 86 of the frame 22.

Referring to FIGS. 4 and 5, a support structure 88 is attached to the second end 74 of the support beam 70, i.e., to the second beam portion 80 of the support beam 70. As such, the support beam 70 interconnects the frame 22 and the support structure 88. The support beam 70 supports the support structure 88 relative to the frame 22. The support structure 88 includes a rotational drive 90, and supports a track 92. The rotational drive 90 includes a motor 94 coupled to a crank 96. The motor 94 is operable to rotate the crank 96 about a rotation axis 98. The motor 94 may include, but is not limited to, an electric motor 94, a hydraulic motor 94, or some other device capable for rotating the crank 96 about the rotation axis 98. In the example embodiment shown in the Figures and described herein, the first beam axis 76, the second beam axis 84, and the rotation axis 98 are substantially parallel with each other, and are all orientated in a substantially vertical orientation.

The track 92 forms a closed loop defining the a first path 100. The closed loop is disposed on a generally horizontal plane, and is generally perpendicular to the rotation axis 98. In the example embodiment shown in the Figures and described herein, the track 92 includes quadrilateral shape with rounded corners, e.g., a rounded rectangular shape. Accordingly, the track 92 includes a pair of opposing longitudinal legs 102 and a pair of opposing transverse legs 104. The pair of longitudinal legs 102 extend along the longitudinal axis of the frame 22 when the track 92 is positioned in the deployed position. The pair of transverse legs 104 extend transverse to the longitudinal axis of the frame 22 when the track 92 is positioned in the deployed position. Each of the pair of longitudinal legs 102 has a length that is greater than each of the pair of transverse legs 104. While the track 92 is shown in the Figures and described herein having the rounded rectangular shape, it should be appreciated that the shape of the track 92 may differ from the example embodiment shown and described herein. For example, the track 92 may include an oval shape, and elliptical shape, or some other shape having a longitudinal dimension that is greater than a transverse dimension, relative to the longitudinal axis of the frame 22, when disposed in the deployed position.

A carriage 106 is coupled to the track 92. The carriage 106 is supported by and moveable on the track 92 in an endless loop defined by the path 100 of the track 92. The carriage 106 may be configured in any suitable manner that enables the carriage 106 to move on the track 92. For example, the carriage 106 may include a body supporting one or more rollers 62 engaging the track 92. It should be appreciated that the carriage 106 may be configured in some other manner not shown or described herein.

An arm 108 is attached to and moveable with the carriage 106. The arm 108 extends from the carriage 106 inward toward an interior region of the closed loop of the track 92, i.e., inward toward the rotational drive 90 and the rotation axis 98. The arm 108 includes an elongated slot 110 that extends generally toward and perpendicular to the rotation axis 98. The arm 108 includes an inboard end 112 and an outboard end 114. The inboard end 112 is disposed nearer the rotation axis 98 than the outboard end 114. The outboard end 114 is pivotably attached to the carriage 106 to allow relative rotation between the arm 108 and the carriage 106.

Figure 6:
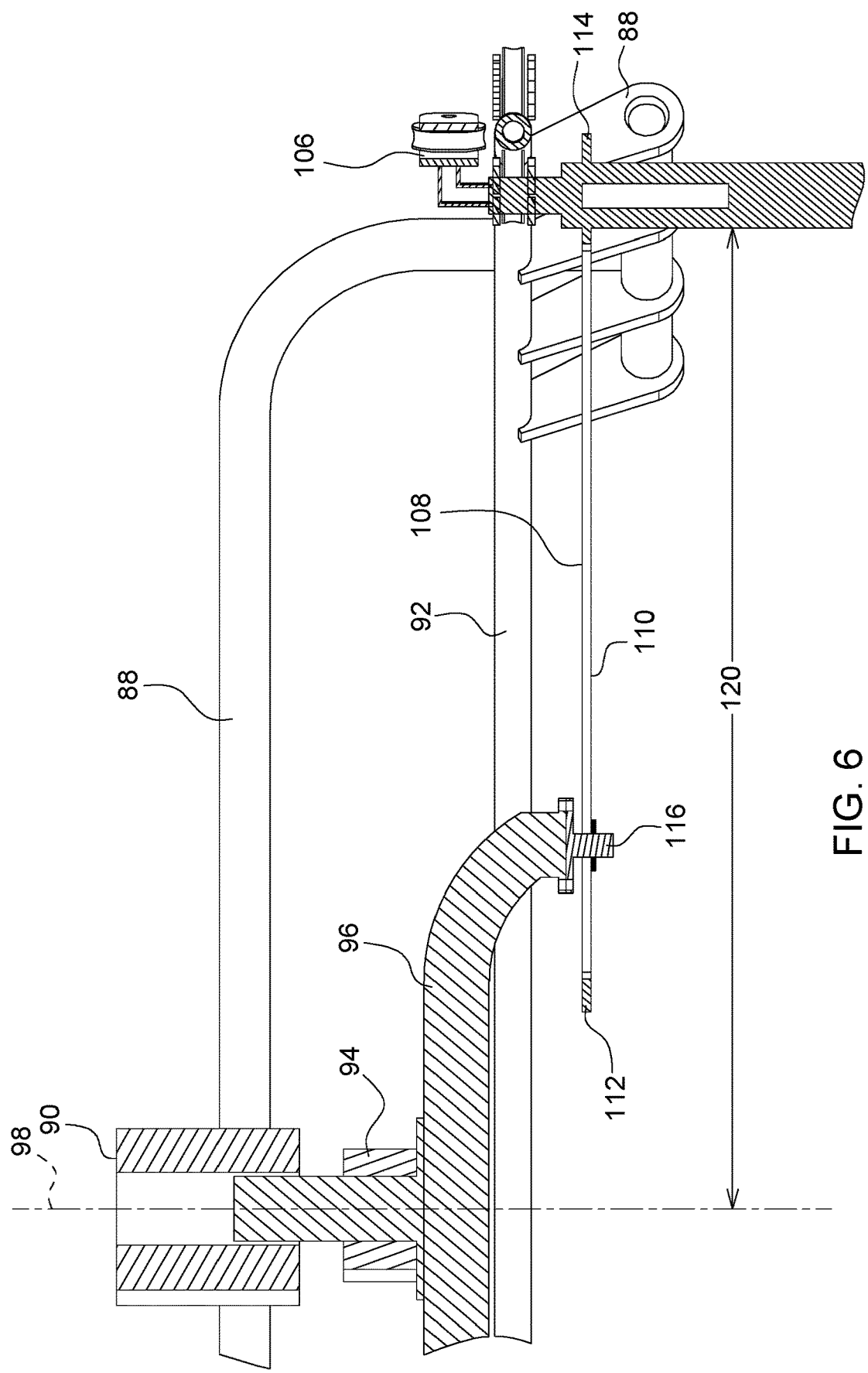
FIG. 6 is a schematic partial side view of the transverse face wrap system showing a crank engaged within an elongated slot of an arm.

Referring to FIG. 6, the crank 96 includes a male portion 116 extending through and slideably moveable within the elongated slot 110. The male portion 116 of the crank 96 moves back and forth within the elongated slot 110 as the carriage 106 moves around the path 100 defined by the track 92. The male portion 116 of the crank 96 engages the elongated slot 110 of the arm 108 in a manner that allows axial movement between the crank 96 and the arm 108 in a long direction of the elongated slot 110, but that does not allow relative rotation between the crank 96 and the arm 108 about the portion of the crank 96 engaging the elongated slot 110. Accordingly, the portion of the crank 96 slides within the elongated slot 110 without any relative rotation between the crank 96 and the arm 108.

Referring to FIGS. 4 and 5, the carriage 106 supports a transverse face wrap roller 118. The transverse face wrap roller 118 extends vertically downward from the carriage 106. The transverse face wrap roller 118 moves with the carriage 106 in the endless loop along the path 100 defined by the track 92, which surrounds the bale. A distance 120 between the transverse face wrap roller 118 and the rotation axis 98 is variable with movement of the transverse face wrap roller 118 around the path 100 defined by the track 92. Accordingly, as the carriage 106 moves around the path 100 defined by the track 92, the male portion 116 of the crank 96 engaged with the elongated slot 110 slides within the elongated slot 110, thereby changing the distance 120 between the transverse face wrap roller 118 and the rotation axis 98. The sliding engagement between the crank 96 and the arm 108 enables the path 100 defined by the track 92 to include a variable radial distance 120 relative to the rotation axis 98, which enables the path 100 to be formed to more closely exhibit the exterior shape of the bale. This in turn reduces the overall width of the transverse wrap system compared to warp systems that have a circular path 100.

The transverse face wrap roller 118 is configured to support a roll of wrap material 122 thereon, such that the wrap material may be unwound from the transverse face wrap roller 118 as the carriage 106 moves around the path 100 defined by the track 92. As such, the transverse face wrap roller 118, when loaded with the roll of wrap material 122, is configured to wrap at least the forward end face 42 and the rearward end face 44 of the bale with the wrap material as the transverse face wrap roller 118 moves in the endless loop along the path 100. More specifically, the transverse wrap roller wraps the forward end face 42, the left side face 34, the rearward end face 44, and the right side face 36 as the transverse face wrap roller 118 moves in the endless loop along the path 100 with the carriage 106.

A trailer 124 is coupled to the frame 22 rearward of the baling chamber 26. The trailer 124 is positioned to receive the bale directly from the baling chamber 26 as the bale is ejected from the baling chamber 26. The trailer 124 defines a first position 126 disposed rearward of the baling chamber 26 for receiving the bale from the baling chamber 26, and a second position 128 laterally offset to a side of the first position 126. The bale is positioned relative to the track 92 so that the transverse face wrap roller 118 encircles the bale when the bale is disposed in the second position 128 of the trailer 124 and the transverse wrap system id disposed in the deployed position.

The trailer 124 may be configured in any suitable manner that is capable of receiving the bale from the baling chamber 26 onto the first position 126, transferring the bale from the first position 126 into the second position 128, and then discharging the bale from the second position 128 onto the ground. The trailer 124 may include, but is not limited to, different rollers 62 and push-bars for moving the bale between the first position 126 and the second position 128. Additionally, the trailer 124 may include a foldable wing that forms the second portion, such that the wing of the trailer 124 may be folded inward toward the longitudinal axis of the frame 22, into a storage position, when not in use.

In operation, the bale is discharged from the baling chamber 26 onto the first position 126 of the trailer 124. The longitudinal face wrap system 48 may wrap the longitudinal faces of the bale as the bale is transferred from the baling chamber 26 to the first position 126 of the trailer 124. Once positioned in the first position 126 of the trailer 124, with the longitudinal faces of the bale wrapped, the bale is then transferred into the second position 128 of the trailer 124. With the transverse face wrap system 50 positioned in the deployed position, the motor 94 of the rotational drive 90 rotates the crank 96, which in turn moves the carriage 106 around the path 100 defined by the track 92. As the carriage 106 encircles the bale, the wrap material is unwound from the transverse face wrap roller 118 onto the transverse faces of the bale, thereby fully enclosing the bale in the wrap material.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A crop baling implement comprising:
   a frame;
   a baling chamber attached to the frame and sized to form crop material into a bale extending along a central longitudinal axis;
   wherein the bale includes a left side face, a right side face, a top face, a bottom face, a forward end face, and a rearward end face;
   wherein each of the left side face, the right side face, the top face, and the bottom face extend along the central longitudinal axis, and wherein each of the forward end face and the rearward end face extend transverse to the central longitudinal axis;
   a transverse face wrap roller coupled to the frame and moveable in an endless loop along a path surrounding the bale, wherein the transverse face wrap roller is operable to hold a roll of wrap material and wrap the forward end face and the rearward end face of the bale with the wrap material as the transverse face wrap roller moves in the endless loop along the path;
   a track forming a closed loop defining the path;
   wherein the track includes a pair of opposing longitudinal legs and a pair of opposing transverse legs, with each of the pair of longitudinal legs having a length that is greater than each of the pair of transverse legs; and
   wherein the pair of longitudinal legs extend along a longitudinal axis of the frame when the track is positioned in a deployed position for wrapping the forward end face and the rearward end face with the wrap material, and the pair of transverse legs extend transverse to the longitudinal axis of the frame when the track is positioned in the deployed position for wrapping the forward end face and the rearward end face with the wrap material.

2. The crop baling implement set forth in claim 1, wherein the track defines a rounded rectangular shape.

3. The crop baling implement set forth in claim 1, further comprising a carriage coupled to the track and supporting the transverse face wrap roller, wherein the carriage is moveable on the track.

4. The crop baling implement set forth in claim 3, further comprising an arm attached to and moveable with the carriage, wherein the arm extends from the carriage inward toward an interior region of the closed loop of the track.

5. The crop baling implement set forth in claim 4, wherein the arm includes an elongated slot.

6. The crop baling implement set forth in claim 5, further comprising a rotational drive having a crank rotatable about a rotation axis, wherein the crank includes a portion extending through and moveable within the elongated slot, such that the portion of the crank moves back and forth within the elongated slot as the carriage moves around the path defined by the track.

7. The crop baling implement set forth in claim 6, wherein the rotational drive includes a motor coupled to the crank and operable to rotate the crank about the rotation axis.

8. The crop baling implement set forth in claim 6, further comprising a support structure interconnecting the rotational drive and the track.

9. The crop baling implement set forth in claim 8, further comprising a support beam interconnecting the frame and the support structure.

10. The crop baling implement set forth in claim 9, wherein the support beam includes a first end pivotably attached to the frame for rotational movement about a first beam axis.

11. The crop baling implement set forth in claim 10, wherein the support beam includes a second end attached to the support structure.

12. The crop baling implement set forth in claim 11, wherein the support beam includes a first beam portion including the first end, a second beam portion including the second end, and further comprising a hinge joint interconnecting the first beam portion and the second beam portion, whereby the hinge joint enables rotational movement between the first beam portion and the second beam portion about a second beam axis.

13. The crop baling implement set forth in claim 12, wherein the first beam axis, the second beam axis, and the rotation axis are substantially parallel with each other.

14. The crop baling implement set forth in claim 12, wherein the first beam portion and the second beam portion are moveable relative to the frame between a deployed position for wrapping the forward end face and the rearward end face of the bale, and a transport position disposed generally rearward of the frame.

15. The crop baling implement set forth in claim 6, wherein a distance between the transverse face wrap roller and the rotation axis is variable with movement of the transverse face wrap roller around the path defined by the track.

16. The crop baling implement set forth in claim 1, further comprising a longitudinal face wrap roller coupled to the frame and moveable in an endless loop encircling the bale as the bale is ejected from the baling chamber, wherein the longitudinal face wrap roller is operable to hold a roll of wrap material and wrap the left side face, the right side face, the top face, and the bottom face of the bale with the wrap material as the longitudinal face wrap roller moves in the endless loop around the bale.

17. The crop baling implement set forth in claim 1, further comprising a trailer coupled to the frame and positioned to receive the bale directly from the baling chamber as the bale is ejected from the baling chamber, wherein the trailer defines a first position disposed rearward of the baling chamber for receiving the bale from the baling chamber, and a second position laterally offset to a side of the first position, whereby the bale is positioned relative to the track so that the transverse face wrap roller encircles the bale when the bale is disposed in the second position of the trailer.

18. A crop baling implement comprising:
   a frame;
   a baling chamber attached to the frame and sized to form crop material into a bale extending along a central longitudinal axis;
   wherein the bale includes a left side face, a right side face, a top face, a bottom face, a forward end face, and a rearward end face;

wherein each of the left side face, the right side face, the top face, and the bottom face extend along the central longitudinal axis, and wherein each of the forward end face and the rearward end face extend transverse to the central longitudinal axis;

a support beam including a first end pivotably attached to the frame for rotation about a first beam axis, and extending to a distal second end;

a support structure attached to the second end of the support beam;

a track attached to the support structure, the track including an endless loop defining a path;

a rotational drive attached to the support structure, and including a crank rotatable about a rotation axis;

an arm coupled to the crank, wherein the arm includes an elongated slot, and the crank includes a portion extending through and moveable within the elongated slot;

a carriage attached to the arm and moveable on the track along the path, the carriage supporting a transverse face wrap roller, wherein the transverse face wrap roller is operable to hold a roll of wrap material and wrap the forward end face and the rearward end face of the bale with the wrap material as the carriage moves on the track in the endless loop along the path; and wherein the portion of the crank disposed within the elongated slot of the arm moves back and forth within the elongated slot as the carriage moves around the path, such that a distance between the transverse face wrap roller and the rotation axis is variable with movement of the carriage around the path.

* * * * *